United States Patent
Schwandt et al.

(12) 
(10) Patent No.: US 6,319,402 B1
(45) Date of Patent: Nov. 20, 2001

(54) EXTENDED LIFE DUAL FULL-FLOW AND BYPASS FILTER

(75) Inventors: Brian W. Schwandt, Fort Atkinson, WI (US); Peter K. Herman; David M. Stehouwer, both of Cookeville, TN (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/466,388

(22) Filed: Dec. 17, 1999

(51) Int. Cl.[7] .................................................... B01D 29/66
(52) U.S. Cl. .................. 210/323.2; 210/333.01; 210/416.5; 210/DIG. 13
(58) Field of Search .......................... 210/323.2, 333.01, 210/340, 411, 416.1, 416.5, DIG. 13; 417/151

(56) References Cited

U.S. PATENT DOCUMENTS

| | | |
|---|---|---|
| 4,073,632 | 2/1978 | Reinauer et al. . |
| 4,251,244 | 2/1981 | Evenstad . |
| 4,289,511 | 9/1981 | Johnson, Jr. . |
| 4,832,836 | 5/1989 | Selsdon . |
| 4,885,082 | 12/1989 | Cantoni . |
| 5,462,679 | 10/1995 | Verdegan et al. . |
| 5,562,746 | 10/1996 | Raether . |
| 5,591,339 | 1/1997 | Robinson . |
| 5,695,637 | 12/1997 | Jiang et al. . |
| 5,779,900 | 7/1998 | Holm et al. . |
| 5,858,224 | 1/1999 | Shwandt et al. . |

Primary Examiner—Matthew O. Savage
(74) Attorney, Agent, or Firm—Andrus, Sceales, Starke & Sawall, LLP

(57) ABSTRACT

A cleanable backflushable re-usable dual full-flow and bypass filter includes a full-flow filter element providing filtered primary flow therethrough, a bypass filter element providing filtered secondary flow therethrough, a bypass tube conducting flow therethrough from said bypass filter element to said full-flow filter element, a venturi creating a low pressure zone aiding secondary flow through the bypass tube to assist in pulling the secondary flow through the more restrictive bypass filter element, wherein fluid, whether main fluid flow in the filtering direction or backflushing cleansing fluid flow in the opposite direction, flowing from the bypass tube changes direction at the venturi. During a backflushing cleaning cycle, a backflush deflector at the outlet end of the bypass tube in the venturi creates the directional change by changing axial flow of cleansing fluid through the bypass tube to radial flow at the outlet end of the bypass tube in the venturi and prevents straight-through rectilinear flow of cleansing fluid from the bypass tube to the filter outlet. Jets are provided, jumping the cleansing fluid across a radial gap between the bypass tube and the venturi throat to a region outside of the venturi and within the hollow interior of the full-flow filter element, to disperse and backflush the full-flow filter element.

26 Claims, 6 Drawing Sheets

EXTENDED LIFE DUAL FULL-FLOW AND BYPASS FILTER

BACKGROUND AND SUMMARY

The invention relates to fluid filters, more particularly to extended life filters, and more particularly to dual full-flow and bypass filters, and further particularly to cleanable and re-usable dual full-flow and bypass filters.

The invention relates to continuing development efforts relating to dual full-flow and bypass filters such as shown in Jiang et al U.S. Pat. No. 5,695,637, and to adaptation thereof for use in cleanable re-usable backflushable filter applications, such as shown in U.S. Pat. Nos. 5,462,679, 5,779,900, 5,858,224, all incorporated herein by reference.

Cleanable re-usable filters backflush the filter element with a cleansing fluid, such as air, in a direction opposite to the filtering direction. This has been found beneficial to extend the life of the filtering medium. This would also be desirable in a dual full-flow and bypass filter which includes a full-flow filter element providing a filtered primary flow therethrough, and a bypass filter element providing filtered secondary flow therethrough in parallel with the primary flow. The full-flow and bypass filter elements are annular and coaxially aligned, and the filtered fluid flows radially inwardly through each element into the hollow interiors thereof. A bypass tube extends axially in the hollow interiors of the filter elements and conducts filtered secondary flow axially therethrough after passage through the bypass filter element, and then merges the filtered secondary flow with the filtered primary flow in the hollow interior of the full-flow filter element. It is known to provide a venturi in the hollow interior of the full-flow filter element creating a low pressure zone aiding suction through the bypass tube of secondary flow from the more restrictive bypass filter element. This venturi-aided suction flow merges with the primary flow from the full-flow filter element and then flows to the filter outlet for return to a machine, such as an internal combustion engine.

In attempting to apply a backflush to the noted dual full-flow and bypass filter arrangement, it was found that little or no cleaning resulted. The present invention recognizes the cause of such problem, and provides a simple and effective solution. Namely, it has been found that the noted venturi suction effect, while desirable in the normal filtering operational mode, is undesirable in the cleaning cycle during backflush because it suctions the cleansing fluid to the filter outlet, effectively shunting same away from the full-flow and bypass filter elements which it is intended to cleanse. The present invention retains the venturi effect during the normal filtering operational mode, and shorts across and bypasses the venturi during the backflushing cleaning mode.

DETAILED DESCRIPTION

Prior Art

Figure 1:
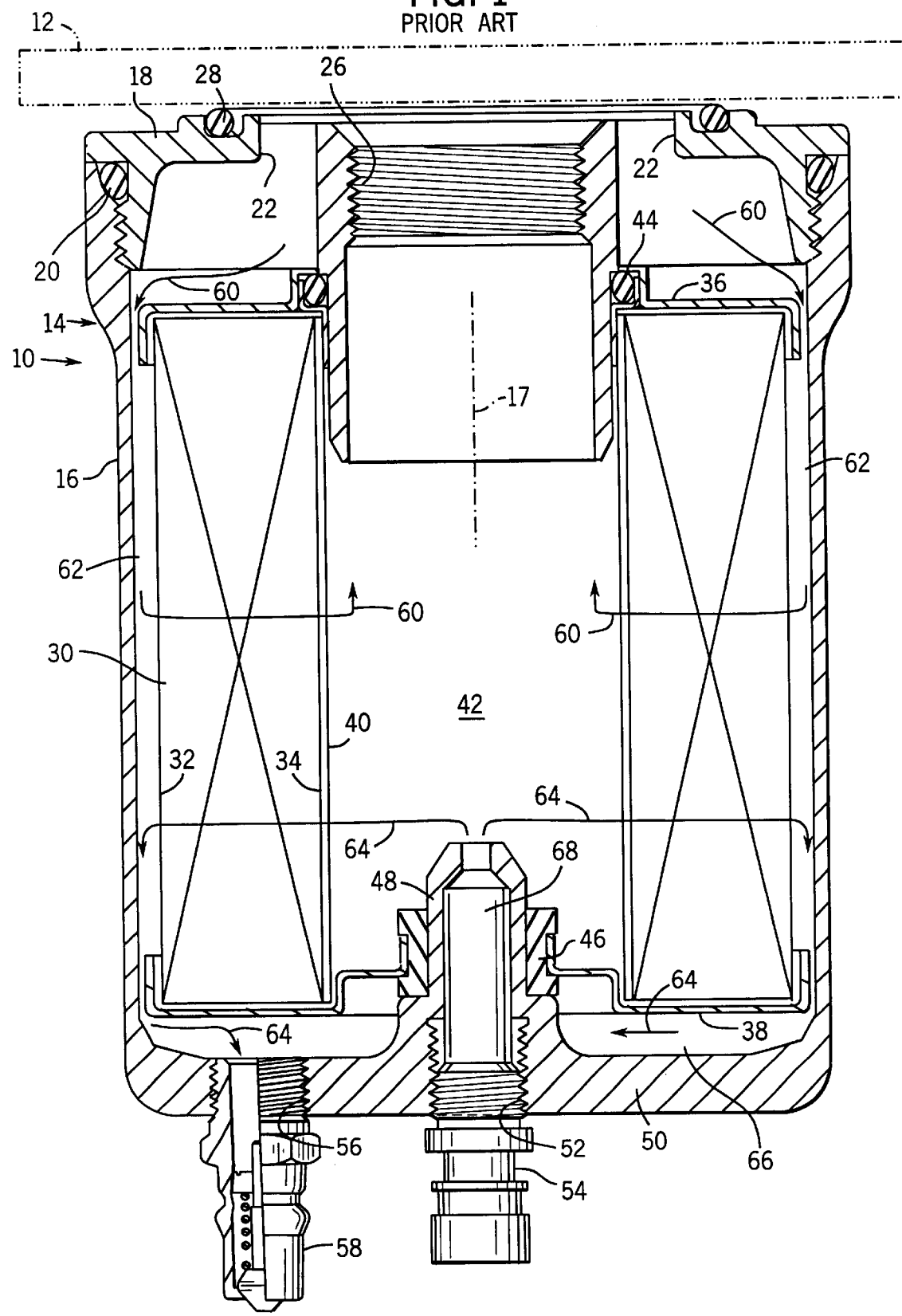
FIG. 1 is a sectional view illustrating a cleanable re-usable backflushable filter known in the prior art, and is similar to FIGS. 4 and 5 of U.S. Pat. No. 5,779,900, incorporated herein by reference.

FIG. 1 shows a filter 10 for filtering fluid, such as lubricating oil, from a machine 12, such as an internal combustion engine. Filter housing 14 includes an open-topped cylindrical canister 16 closed by threaded adapter plate 18 in sealing relation at O-ring 20. Adapter plate 18 has a plurality of circumferentially spaced openings 22 providing inlets for receiving fluid from machine 12, for example engine oil, and having an outlet 26 for returning the fluid to the machine. Outlet 26 is internally threaded for mounting to a mounting boss of an internal combustion engine as is standard. The filter housing at adapter plate 18 is mounted to the engine block in sealing relation at O-ring 28. Mounted within the housing is a fluid filter element 30 provided by pleated filter media having an upstream dirty side 32 and a downstream clean side 34 and filtering fluid passing therethrough from upstream side 32 to downstream side 34 as is standard. The pleated filter media is potted between end caps 36 and 38, and includes an inner perforated metal liner 40 engaging and supporting the inner pleat tips and defining hollow interior 42 of the filter. Upper end cap 36 is sealed to the adapter plate outlet at O-ring 44. Lower end cap 38 is sealed at grommet 46 to a central upstanding stud portion 48 extending axially from lower end 50 of the housing. The filter housing has a central lower threaded inlet 52 receiving air inlet valve 54 in threaded relation. The filter housing has a lower threaded outlet 56 receiving a drain valve 58 in threaded relation, all as in the noted incorporated U.S. Pat. No. 5,779,900.

As noted in the incorporated '900 patent, the filter housing has a first flow path therethrough as shown at arrows 60 from inlets 22 then flowing downwardly through outer annular passage 62 then flowing radially inwardly through pleated filter media element 30 then flowing axially upwardly through outlet 26. The filter housing has a second flow path therethrough as shown at arrows 64 flowing from inlet 52 axially upwardly into hollow interior 42 then radially outwardly and then downwardly through outer annular passage 62 to lower collection chamber 66 to outlet 56 and through drain valve 58. During normal filtering operation during running of the engine, lubricating oil flows along the noted first flow path 60 and is filtered and returned to the engine. With the engine off, a cleaning cycle can be initiated by introducing a cleansing fluid such as air at inlet valve 54 such that air flows along the noted second flow path 64 to backflush and clean pleated filter element 30. An auxiliary filter element 68 within stud portion 48 filters the cleansing fluid such as air. The above described structure and operation is known in the prior art, for which further reference may be had to the noted incorporated '900 patent.

Figure 2:
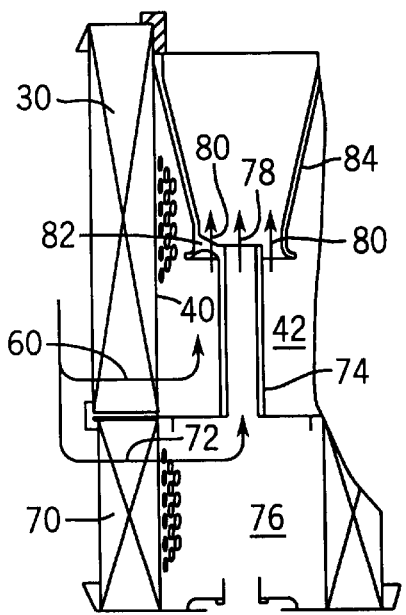
FIG. 2 is a schematic illustration of a dual full-flow and bypass filter known in the prior art, for example as shown in U.S. Pat. No. 5,695,637, incorporated herein by reference.
Figure 7:
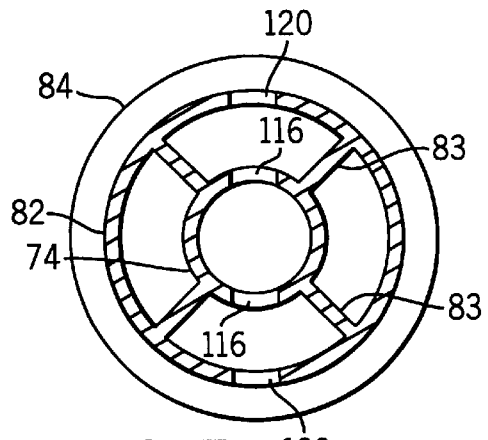
FIG. 7 is a sectional view taken along line 7—7 of FIG. 6.
Figure 8:
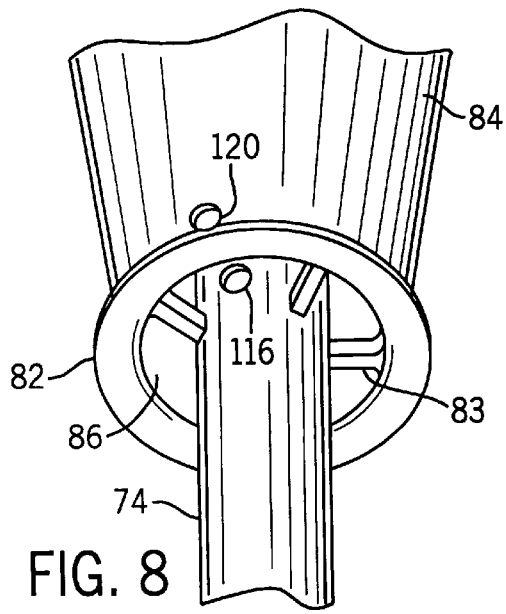
FIG. 8 is an isometric view of a portion of FIG. 6.
Figure 3:
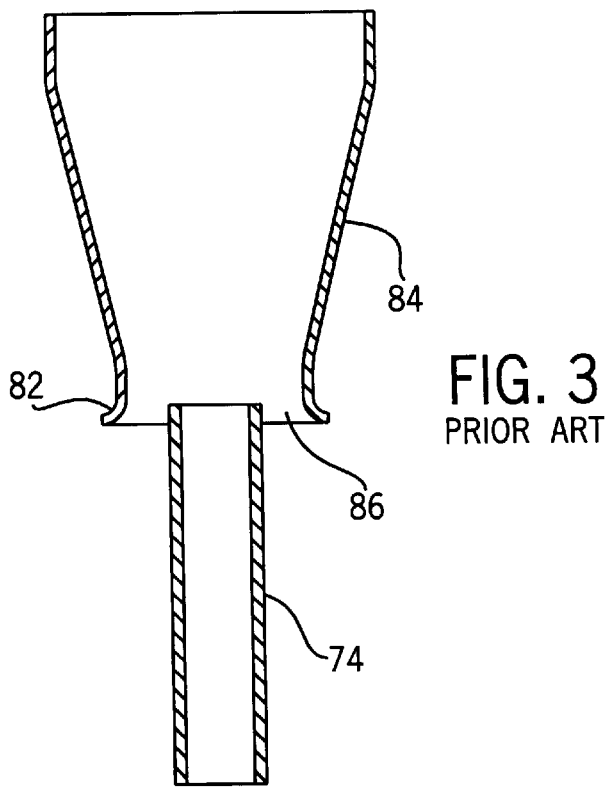
FIG. 3 is an illustration of a portion of FIG. 2.
Figure 6:
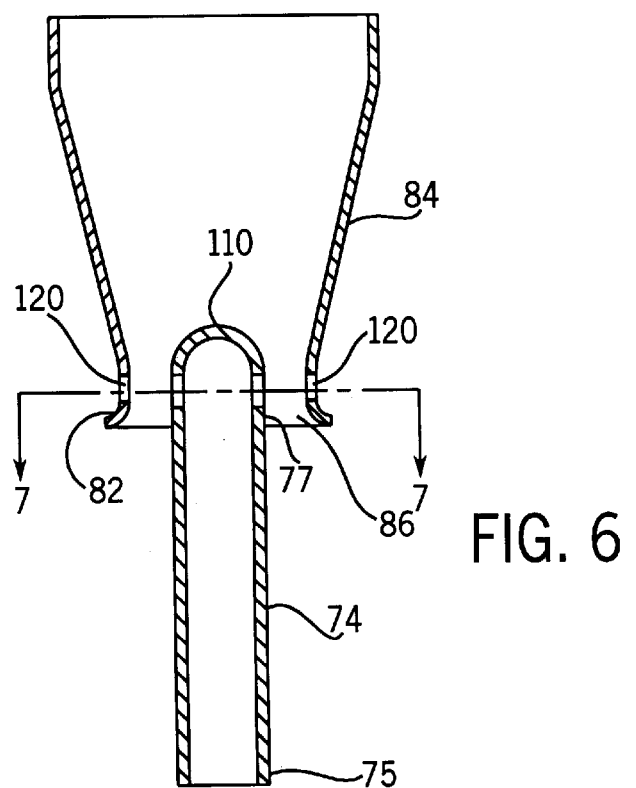
FIG. 6 is an illustration of a portion of the structure in accordance with FIGS. 4 and 5.

FIG. 2 shows another filter known in the prior art and uses like reference numerals from FIG. 1 where appropriate to facilitate understanding. In addition to main full-flow pleated annular filter element 30, a bypass pleated annular filter element 70 is provided, coaxially aligned with element 30. The fluid filtering flow path includes a first branch through full-flow element 30 as noted above at 60, and a second branch at 72 through bypass element 70. Bypass filter element 70 is more restrictive than full-flow filter element 30 and provides an alternate or back-up flow path for the fluid as filter element 30 becomes clogged with usage, whereby the fluid may continue to flow and be filtered along path 72. A bypass tube 74 extends axially and conducts fluid flow from hollow interior 76 of bypass filter element 70 into hollow interior 42 of full-flow filter element 30. The bypass flow from flow path 72 merges as shown at arrow 78 with the main flow from path 60 as shown at arrows 80. Bypass tube 74 extends into throat 82 of venturi 84 in hollow interior 42 of filter element 30. Venturi throat 82 concentrically surrounds the end of bypass tube 74, for example as shown in U.S. Pat. No. 5,695,637, incorporated herein by reference, and creates a low pressure zone 86, FIG. 3, in the annulus between bypass tube 74 and venturi throat 82 which assists in pulling fluid flow through bypass tube 74 and the more restrictive bypass filter element 70.

Present Invention

In attempting to adapt the dual full-flow and bypass filter of FIG. 2 for use in cleanable backflushable re-usable filter applications, poor or nonexistent cleaning effectiveness was observed. The present invention recognizes the cause of such problem, namely the cleansing fluid introduced at valve 54, FIG. 1, which typically is pressurized air, flows straight out the bypass tube 74, FIG. 2, and straight through venturi 84 as shown at arrow 78 to the filter outlet 26 and into engine 12, which in turn is caused by the suction effect of venturi 84. The present invention recognizes such cause and provides a simple and effective solution to such problem while still retaining the desirable benefits of the venturi during normal filtering operation. The invention is illustrated in FIGS. 4–11, which use like reference numerals from above where appropriate to facilitate understanding.

Figure 4:
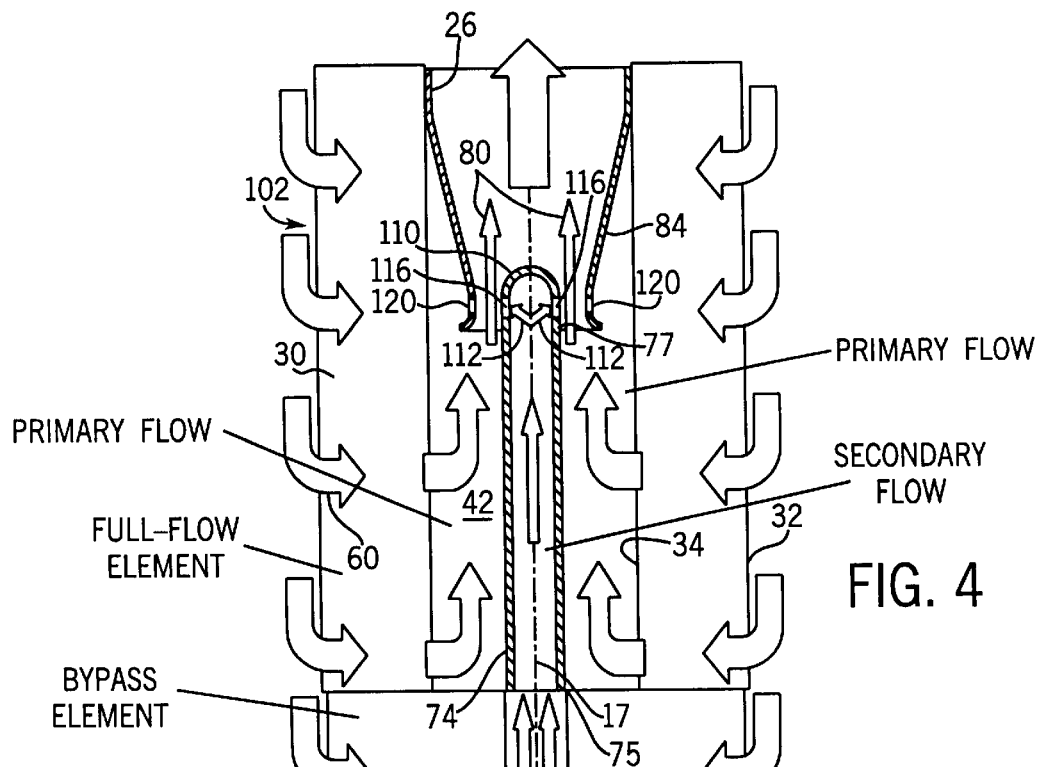
FIG. 4 is a schematic illustration of a filter in accordance with the present invention, showing the normal filtering operational mode.
Figure 5:
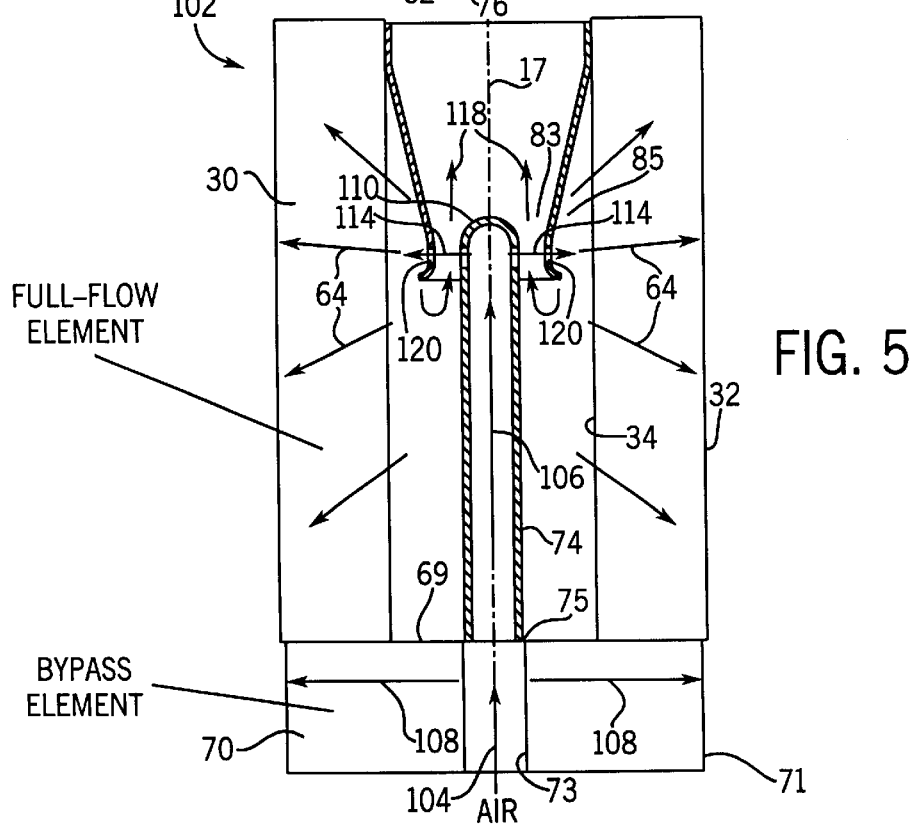
FIG. 5 is like FIG. 4 but shows the cleaning backflush mode.
Figure 9:
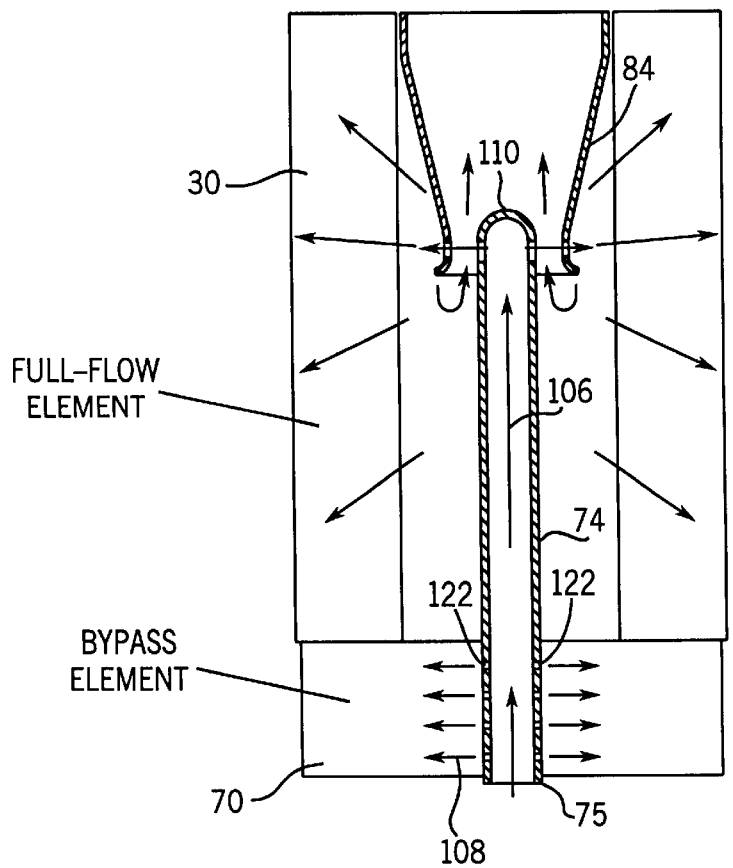
FIG. 9 is like FIG. 5, and shows an alternate embodiment.
Figure 10:
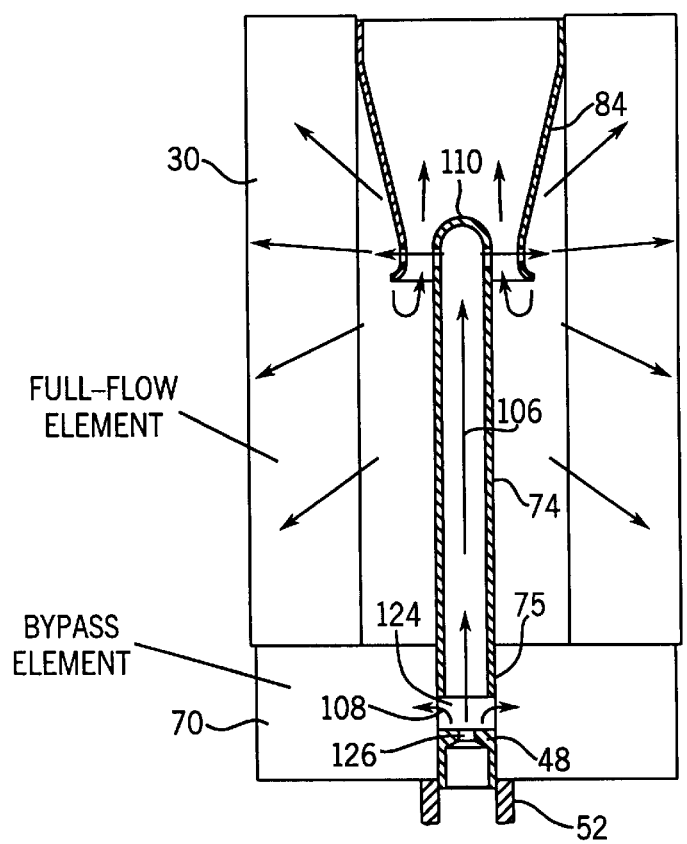
FIG. 10 is like FIG. 5, and shows another alternate embodiment.

FIGS. 4 and 5 show a cleanable backflushable re-usable dual full-flow and bypass filter 102 for filtering fluid from a machine such as internal combustion engine 12. The filter is housed in filter housing 16, FIGS. 1 and 11, extending along an axis 17 and having the noted first inlet 22 receiving fluid from the machine, such as lubricating oil from engine 12, and having the noted first outlet 26 returning the fluid to engine 12, and having the noted second inlet 52 selectively receiving a cleansing fluid, such as air, for backflushing, and the noted second outlet 56 exhausting the cleansing fluid and backflushed contaminants. Full-flow filter element 30 extends axially in the filter housing and has the noted hollow interior 42, and upstream dirty side 32 and downstream clean side 34. Bypass filter element 70 extends axially in the filter housing and has the noted hollow interior 76, and an upstream dirty side 71 and a downstream clean side 73. Hollow interiors 42 and 76 of the full-flow and bypass filter elements are coaxially aligned along axis 17. Bypass tube 74 extends axially along axis 17 and has a lower inlet end 75 communicating with hollow interior 76 of bypass filter element 70, and has an upper outlet end 77 communicating with the hollow interior of the full-flow filter element within venturi 84. The venturi is in hollow interior 42 of full-flow filter element 30 and communicates between bypass tube end 77 and the noted filter outlet 26. The filter housing has the noted filtering flow path therethrough from inlet 22 then through the full-flow and bypass filter elements in parallel at 60 and 72 in one direction then to outlet 26. The flow path has a first branch 60 from inlet 22 then through full-flow filter element 30 in a radial inward direction from upstream dirty side 32 to downstream clean side 34 then through hollow interior 42 then through venturi 84 to outlet 26. The flow path has a second branch 72 from inlet 22 then through bypass filter element 70 in the radial inward direction from upstream dirty side 71 to downstream clean side 73 then through hollow interior 76 then through bypass tube 74 to the hollow interior of the full-flow filter element at venturi 84 then through venturi 84 to outlet 26. The filter housing has the noted cleansing backflush flow path therethrough in the opposite direction, the cleansing fluid flowing from inlet 52 then through the full-flow and bypass filter elements in radially outward directions then to outlet 56. The filter flow path and the backflush flow path have common but opposite direction portions through the full-flow and bypass filter elements. The backflush flow path has a first branch from inlet 52 then through hollow interior 76 as shown at arrow 104 then through bypass tube 74 as shown at arrow 106 to the hollow interior of full-flow filter element 30 then through full-flow filter element 30 in the radial outward direction as shown at arrows 64 from downstream clean side 34 to upstream dirty side 32 then to outlet 56. The backflush flow path has a second branch from inlet 56 through hollow interior 76 as shown at arrow 104 then through bypass filter element 70 in the radial outward direction as shown at arrows 108 from downstream clean side 73 to upstream dirty side 71 of the bypass filter element then to outlet 56.

A backflush deflector or diffuser 110 is provided at outlet end 77 of bypass tube 74 and creates a directional change in flow of cleansing fluid along the noted backflush flow path and re-directs such flow as shown at arrows 112, 114 to backflush full-flow filter element 30. In one embodiment, bypass tube 74 is provided with a closed end or cap at 110, and a plurality of radial holes or passages 116 are provided through the bypass tube for re-directing deflected flow 112 therethrough as shown at 114. Deflector 110 prevents straight-through flow of cleansing fluid such as pressurized air from bypass tube 74 into the interior of venturi 84 and then into engine 12. Deflector 110 instead causes the noted directional change in flow of the cleansing fluid and disperses same to filter element 30 to perform the desired function of dislodging captured debris and sludge. Testing has shown that there is a vacuum at port 56. This is due to the effect of venturi 84. Hence, without deflector 110, there is little or no backflush cleaning of filter element 30 by the cleansing fluid because such cleansing fluid is instead sucked from the end of the bypass tube 74 straight through the venturi 84 and into the engine. With the addition of deflector 110, such straight-through flow path is eliminated, and a directional change in the cleansing fluid flow path is created, to in turn disperse the cleansing fluid to perform its intended function, and reduce the leakage flow of cleansing fluid in venturi 84, as shown at arrows 118, flowing to the engine.

Bypass tube 74 has the noted inlet end 75 communicating with hollow interior 76 of bypass filter element 70. Venturi 84 has the noted throat 82 concentrically surrounding outlet end 77 of bypass tube 74, FIGS. 6–8, and creating the noted low pressure zone 86 between the outlet 77 of the bypass tube and throat 82. Bypass tube 74 extends axially between inlet end 75 and outlet end 77. Backflushing cleansing fluid flows through bypass tube 74 axially from inlet 75 to outlet 77 then radially through holes 116 as shown at arrows 112, 114 into low pressure zone 86. Throat 82 is spaced radially outwardly of bypass tube 74 by a plurality of radial spokes 83, FIG. 7, defining annular low pressure zone 86. Deflector 110 changes axial flow 106 through bypass tube 74 to radial flow 114 through holes 116 and prevents straight-through rectilinear flow of cleansing fluid at 106 from bypass tube 74 into venturi 84 to outlet 26.

A plurality of jets 120 are provided, causing jumping or shorting of cleansing fluid across radial gap 86 to a region 85 outside of venturi 84 and within hollow interior 42 of full-flow filter element 30. The jets comprise a first set of one or more radial holes, provided by the noted holes 116 through bypass tube 74, and a second set of one or more radial holes or passages 120 through throat 82 of venturi 84. The diameter of radial holes 120 is greater than the diameter of radial holes 116. Respective pairs of holes 116 and 120 are radially aligned to provide rectilinear radial flow at arrow 114 jumping or shorting across gap 86.

The noted venturi effect, creating low pressure zone 86, is desirable during the normal filtering operational mode of filter 102 during running condition of engine 12 to assist in pulling fluid flow through bypass tube 74 and the more restrictive bypass filter element 70, yet is undesirable in the off condition of the engine during a backflushing cleaning cycle of filter 102 because of the shunting effect on cleansing fluid flowing from the bypass tube to the engine through the venturi. Deflector 110 retains the desirable venturi effect during running of the engine and allows lubricating oil flow through bypass filter element 70 at flow path 72 then axially through bypass tube 74 and then through holes 116 into venturi 84 and then returning to the engine at arrows 80, FIG. 4. Deflector 110 reduces the noted venturi shunting effect on cleansing fluid during a cleaning cycle, as above noted, FIG. 5. Venturi 84 has an interior region 87 facing outlet end 77 of bypass tube 74 in annular gap 86. Venturi 84 has the noted exterior region 85 within hollow interior 42 of full-flow filter element 30 and facing the clean downstream side 34 thereof. Venturi 84 has the noted radial passages 120 therethrough, such that cleansing fluid jets across and jumps annular gap 86 from bypass tube 74 to venturi throat 82 and continues from the interior 87 of the venturi to the exterior 85 of the venturi to disperse and backflush full-flow filter element 30.

Figure 11:
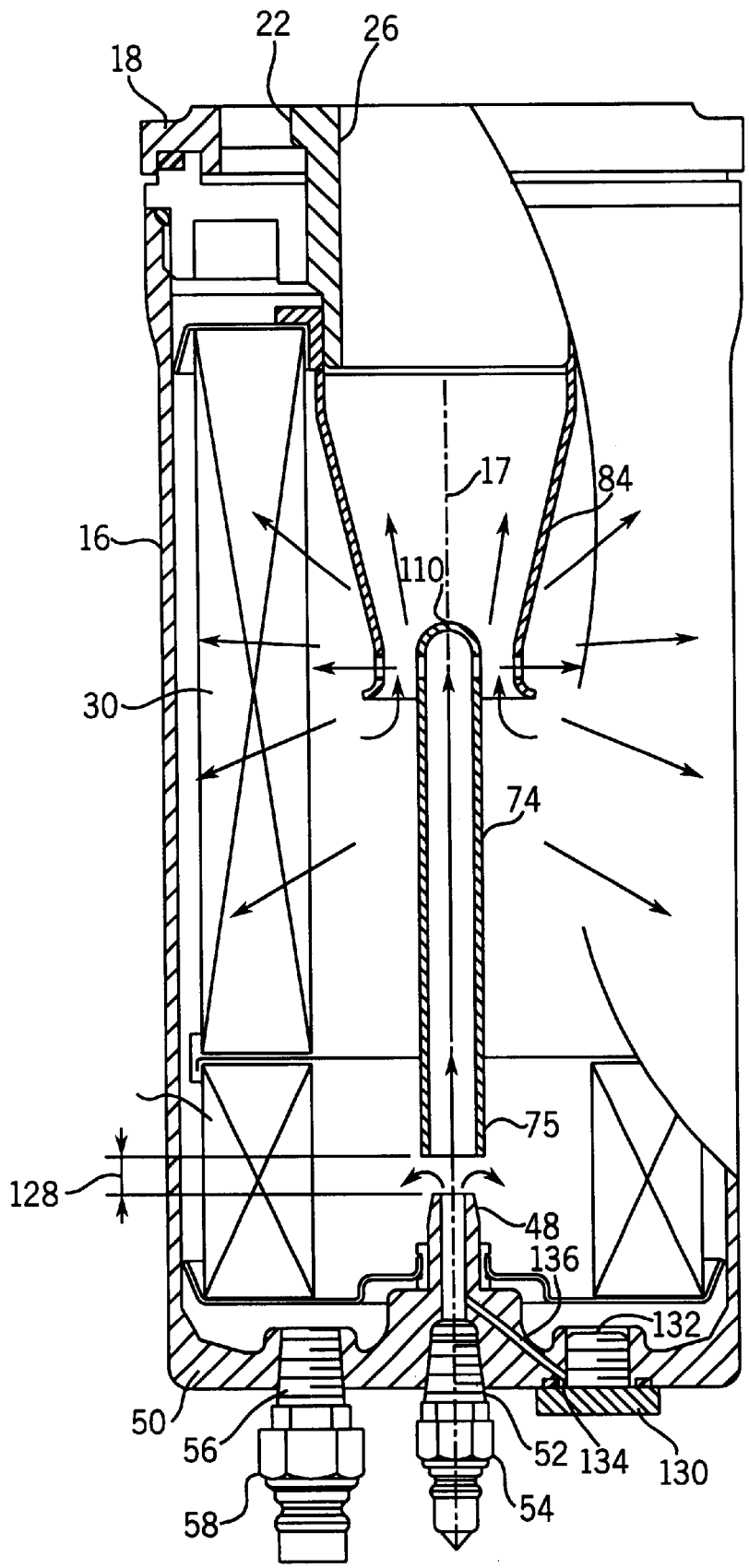
FIG. 11 is a sectional view showing a further embodiment.

A backflush flow split controller is provided to control the ratio of cleansing fluid flowing through the noted second branch 108, FIG. 5, to bypass filter element 70 and flowing through the noted first branch 106 to full-flow filter element 30. In one embodiment maximizing the percentage of backflush fluid flowing to bypass filter element 70 at 108, the lower inlet end 75 of bypass tube 74 stops at the top or axial end 69, FIG. 5, of bypass filter element 70. In another embodiment, FIG. 9, the inlet end 75 of the bypass tube is extended all the way into and through hollow interior 76 of bypass filter element 70, and has a plurality of radial holes 122, wherein the backflush flow split between branches 108 and 106 is controlled by the number and size of holes 122, the number and size each being adjustable to control the noted ratio. In another embodiment, FIG. 10, the inlet end 75 of bypass tube 74 extends partially into hollow interior 76 of bypass filter element 70 and is axially spaced from stud portion 48 of inlet 52 by an axial gap 124, wherein the length of axial gap 124 controls the backflush flow split ratio between branches 108 and 106. A jet nozzle 126 may be provided at inlet 52 causing the majority of cleansing fluid to jet axially across gap 124 to tube 74. The use of jet nozzle 126 is particularly desirable for longer axial gaps 124. For shorter axial gaps 128, FIG. 11, jet nozzle 126 is not used. In FIG. 11, stud portion 48 extends axially upwardly partially into hollow interior 76 of bypass filter element 70, and inlet end 75 of bypass tube 74 extends axially downwardly partially into hollow interior 76 of bypass filter element 70 and is spaced from the upper end of stud portion 48 by axial gap 128.

Adjusting the length of axial gaps 124, 128 controls the noted ratio of cleansing fluid backflush split between branches 108 and 106. If lower end 75 of bypass tube 74 is extended axially all the way to inlet 52, then the noted holes 122 are provided. If stud portion 48 and/or bypass tube 74 are extended axially to meet each other, then an annular gap is provided therebetween and/or holes such as 122 are provided in either or both. In each case above described, the noted ratio of backflush flow split is controlled to provide the majority of cleansing fluid flow along branch 106. A pressure sensor 130, FIG. 11, may optionally be provided, mounted to housing end 50 in threaded relation and having a high pressure port 132 communicating with the high pressure sides 32 and 71 of the full-flow and bypass filter elements, respectively, and having a low pressure port 134 communicating through passage 136 with the low pressure sides 34 and 73 of the full-flow and bypass filter elements, respectively, for example as shown in above noted incorporated U.S. Pat. No. 5,858,224.

It is recognized that various equivalents, alternatives and modifications are possible within the scope of the appended claims. The invention may be used in internal combustion engine lubricating oil applications, and in other applications involving lubricant, fuel, coolant, hydraulic fluid, water, liquid and air.

What is claimed is:

1. A dual full-flow and bypass filter for filtering fluid from a machine comprising a full-flow filter element providing filtered primary flow therethrough, a bypass filter element providing filtered secondary flow therethrough, a bypass tube conducting filtered secondary flow therethrough after passage through said bypass filter element and then merging said filtered secondary flow with said filtered primary flow after passage of said primary flow through said full-flow filter element, a venturi creating a low pressure zone aiding said secondary flow through said bypass tube to assist in pulling said secondary flow through said bypass filter element, a deflector causing a directional change of said secondary flow at said venturi, such that fluid flowing from said bypass tube changes direction at said venturi.

2. The invention according to claim 1 wherein fluid flow through said venturi is parallel to fluid flow through said bypass tube, and wherein fluid flow between said bypass tube and said venturi is nonparallel to said fluid flow through said bypass tube and through said venturi.

3. The invention according to claim 2 wherein said bypass tube extends along an axis and has an inlet communicating with said bypass filter element, and an outlet, said venturi has a throat concentrically surrounding said outlet of said bypass tube and creating said low pressure zone between said outlet of said bypass tube and said throat, said bypass tube extends axially between said inlet and said outlet, fluid through said bypass tube flows axially from said inlet to said outlet then radially relative to said axis into said low pressure zone between said outlet of said bypass tube and said throat of said venturi.

4. The invention according to claim 3 wherein fluid from said low pressure zone flows axially to said machine.

5. The invention according to claim 4 wherein fluid flows radially through said full-flow filter element and radially through said bypass filter element.

6. The invention according to claim 1 wherein said filter has a first filtering flow path therethrough in one direction for filtering said fluid, and a second backflushing flow path therethrough in the opposite direction for flow of a cleansing fluid said bypass tube extends along an axis, said cleansing fluid flowing axially through said bypass tube to said venturi, and wherein said deflector comprises a backflush deflector causing a directional change in flow of cleansing fluid from said bypass tube at said venturi.

7. The invention according to claim 6 comprising a plurality of radial passages from said backflush deflector and said bypass tube, such that cleansing fluid flowing axially through said bypass tube changes direction at said deflector and flows radially relative to said axis through said radial passages.

8. The invention according to claim 7 wherein said cleansing fluid flows radially from said radial passages into said venturi.

9. The invention according to claim 8 wherein said venturi concentrically surrounds said bypass tube and is spaced therefrom by an annular gap, said venturi has an interior facing said bypass tube in said annular gap, and an exterior facing said full-flow filter element, said venturi having a plurality of radial passages therethrough, such that cleansing fluid jets across and jumps said annular gap from said bypass tube to said venturi and continues from said interior of said venturi to said exterior of said venturi, to disperse and backflush said full-flow filter element.

10. The invention according to claim 9 wherein said second mentioned radial passages are radially aligned with and of greater cross-sectional area than said first mentioned radial passages.

11. A cleanable backflushable re-usable dual full-flow and bypass filter for filtering fluid from a machine, comprising:
    a filter housing extending along an axis and having a first inlet receiving a first fluid from said machine, a first outlet returning said first fluid to said machine, a second inlet selectively receiving a second cleansing fluid for backflushing, and a second outlet exhausting said cleansing fluid and backflushed contaminants;
    a full-flow filter element in said filter housing, said full-flow filter element having a hollow interior, an upstream dirty side, and a downstream clean side;
    a bypass filter element in said filter housing, said bypass filter element having a hollow interior, an upstream dirty side, and a downstream clean side, said hollow interiors of said full-flow and bypass filter elements being coaxially aligned along said axis;
    a bypass tube extending axially along said axis and having a first end communicating with said hollow interior of said bypass filter element and having a second end communicating with said hollow interior of said full-flow filter element;
    a venturi in said hollow interior of said full-flow filter element and communicating between said second end of said bypass tube and said first outlet;
    said filter housing having a first flow path therethrough from said first inlet then through said full-flow and bypass filter elements in parallel in one direction then to said first outlet, said first flow path having a first branch from said first inlet then through said full-flow filter element in said one direction from said upstream dirty side of said full-flow filter element to said downstream clean side of said full-flow filter element then through said hollow interior of said full-flow filter element then through said venturi then to said first outlet, said first flow path having a second branch from said first inlet then through said bypass filter element in said one direction from said upstream dirty side of said bypass filter element to said downstream clean side of said bypass filter element then through said hollow interior of said bypass filter element then through said bypass tube to said hollow interior of said full-flow filter element then through said venturi to said first outlet;
    said filter housing having a second flow path therethrough from said second inlet then through said full-flow and bypass filter elements in parallel in the opposite direction then to said second outlet, said first and second flow paths having common but opposite direction portions through said full-flow and bypass filter elements, said second flow path having a first branch from said second inlet then through said hollow interior of said bypass filter element then through said bypass tube to said hollow interior of said full-flow filter element then through said full-flow filter element in said opposite direction from said downstream clean side of said full-flow filter element to said upstream dirty side of said full-flow filter element then to said second outlet, said second flow path having a second branch from said second inlet then through said hollow interior of said bypass filter element then through said bypass filter element in said opposite direction from said downstream clean side of said bypass filter element to said upstream dirty side of said bypass filter element then to said second outlet;
    a backflush deflector at said second end of said bypass tube creating a directional change in flow of said cleansing fluid along said second flow path and re-directing flow of said cleansing fluid to backflush said full-flow filter element.

12. The invention according to claim 11 wherein said backflush deflector changes axial flow of said cleansing fluid through said bypass tube to radial flow relative to said axis at said second end of said bypass tube and prevents straight-through rectilinear flow of said cleansing fluid from said bypass tube through said venturi to said first outlet.

13. The invention according to claim 12 wherein said venturi comprises a throat concentrically surrounding said bypass tube at said second end and creating a low pressure zone in a radial gap therebetween during flow of said first fluid to assist in pulling fluid flow from said bypass filter element and said bypass tube, and comprising one or more jets jumping said cleansing fluid flow across said radial gap to a region outside of said venturi and within said hollow interior of said full-flow filter element.

14. The invention according to claim 13 wherein said jets comprise a first set of one or more radial passages from said bypass tube at said second end thereof, and a second set of one or more radial passages from said venturi at said throat thereof.

15. The invention according to claim 14 wherein said first and second sets of passages comprise first and second sets of radial holes, respectively, and wherein the diameter of said radial holes of said second set is greater than the diameter of said radial holes of said first set.

16. The invention according to claim 11 wherein said backflush deflector comprises an end cap at said second end of said bypass tube, and comprising a plurality of radial passages from said backflush deflector and said bypass tube said second end, such that cleansing fluid flowing axially through said bypass tube changes direction at said deflector and flows radially relative to said axis through said radial passages.

17. The invention according to claim 16 wherein said cleansing fluid flows radially from said radial passages into said venturi.

18. The invention according to claim 17 wherein said venturi concentrically surrounds said second end of said bypass tube and is spaced therefrom by an annular gap, said venturi has an interior facing said second end of said bypass tube in said annular gap, and an exterior within said hollow interior of said full-flow filter element and facing said clean downstream side thereof, said venturi having a plurality of radial passages therethrough, such that cleansing fluid jets across and jumps said annular gap from said bypass tube to said venturi and continues from said interior of said venturi to said exterior of said venturi, to disperse and backflush said fill-flow filter element.

19. The invention according to claim 11 comprising a backflush flow split controller controlling the ratio of said cleansing fluid flowing through said second branch to said bypass filter element and flowing through said first branch to said full-flow filter element.

20. The invention according to claim 19 wherein said first end of said bypass tube is axially spaced from said second inlet by an axial gap in the hollow interior of said bypass filter element, said gap having an axial length, and wherein said backflush flow split controller is said length of said axial gap.

21. The invention according to claim 20 comprising a jet nozzle at said second inlet causing the majority of said cleansing fluid to jet to said bypass tube.

22. The invention according to claim 20 wherein said length controls said ratio.

23. The invention according to claim 19 wherein said first end of said bypass tube extends into said hollow interior of said bypass filter element and has a plurality of radial holes, and wherein said backflush flow split controller is the number and size of said radial holes.

24. The invention according to claim 23 wherein said number and size of said radial holes control said ratio.

25. The invention according to claim 23 wherein said bypass tube at said first end extends axially all the way to said second inlet.

26. The invention according to claim 19 wherein said ratio is controlled to provide the majority of said cleansing fluid flow along said first branch of said second flow path.

* * * * *